(12) United States Patent
Li et al.

(10) Patent No.: US 9,996,767 B2
(45) Date of Patent: Jun. 12, 2018

(54) METHODS FOR AUTOMATED CHART ANALYSIS

(71) Applicant: PANTON, INC., Houston, TX (US)

(72) Inventors: Saishi Frank Li, Sugar Land, TX (US); Jack Dong Wang, Sugar Land, TX (US); Yang Liu, Katy, TX (US); Mingyang Zhu, Missouri City, TX (US); Yong Chen, Houston, TX (US); Bo Chen, Houston, TX (US)

(73) Assignee: PANTON, INC., Houston, TX (US)

( * ) Notice: Subject to any disclaimer, the term of this patent is extended or adjusted under 35 U.S.C. 154(b) by 61 days.

(21) Appl. No.: 15/149,145

(22) Filed: May 26, 2016

(65) Prior Publication Data

US 2017/0344849 A1    Nov. 30, 2017

(51) Int. Cl.
G06K 9/46       (2006.01)
G06K 9/66       (2006.01)
G06T 5/00       (2006.01)
G06K 9/00       (2006.01)

(52) U.S. Cl.
CPC ....... *G06K 9/4671* (2013.01); *G06K 9/00442* (2013.01); *G06T 5/002* (2013.01); *G06T 2207/10004* (2013.01)

(58) Field of Classification Search
CPC .. G06K 9/4671; G06K 9/00442; G06T 5/002; G06T 2207/10004
See application file for complete search history.

(56) References Cited

U.S. PATENT DOCUMENTS

| | | | | |
|---|---|---|---|---|
| 5,978,000 A | * | 11/1999 | Levine | G01D 15/16 346/121 |
| 5,983,164 A | * | 11/1999 | Ocondi | E21B 43/12 702/12 |
| 6,782,319 B1 | * | 8/2004 | McDonough | G01C 21/32 701/461 |
| 2014/0055490 A1 | * | 2/2014 | Mule | G06T 11/80 345/633 |
| 2014/0104291 A1 | * | 4/2014 | Rutz | H04W 24/04 345/589 |
| 2014/0354648 A1 | * | 12/2014 | Bak | G06T 11/206 345/440 |
| 2016/0071296 A1 | * | 3/2016 | Sandquist | G06T 11/206 345/629 |

* cited by examiner

*Primary Examiner* — Samir Ahmed
(74) *Attorney, Agent, or Firm* — Patterson & Sheridan, LLP

(57) ABSTRACT

Methods for analyzing a chart using an electronic computing device are presented, the methods including: causing the electronic computing device to receive a chart image corresponding with the chart, the chart image having recorded chart data; analyzing the recorded chart data, where the analyzing returns at least measurement values corresponding with the recorded chart data; and returning volumetric results of the processing to a user. In some embodiments, the recorded chart data corresponds with data selected from the group consisting of: temperature data, differential pressure data, and static pressure data. In some embodiments, the chart corresponds with a chart integration device or a chart recorder. In some embodiments, methods further include: capturing the chart image with a mobile image capture device.

16 Claims, 5 Drawing Sheets

METHODS FOR AUTOMATED CHART ANALYSIS

BACKGROUND

In general, a chart integration device (or chart integrator) is a device that records mechanical or electrical input data by means of moving a chart (paper or other physical media) across one or more moving pens. FIG. 1 is an illustrative prior art flowchart 100 of a manual method for analyzing such a chart. Chart integration devices are utilized extensively in industry to effectively and efficiently accomplish long-term data acquisition and integration. Presently, conventional methods require many steps to bring the data captured on chart recorders to a useful end. As illustrated, at a first step 102, conventional methods collect a physical chart. Collecting a physical chart requires an operator to physically travel to the location of the chart recorder, which may, in some circumstances, may be located in a very remote area. In some examples, many hundreds or thousands of chart recorders may be in operation at one or more locations. At a next step 104, the physical chart is delivered to a processing location. Delivery may be accomplished in many different manners, however, utilizing mail services is common. It may be further appreciated that the delay in delivery introduced at this step may undermine the ability to rapidly respond to fluctuations in the input data.

At a next step 106, the physical chart may be physically traced by a chart integration operator. As is currently practiced, the physical chart may be placed on a tracing stand device whereupon the chart integration operator will trace the lines representing input data by utilizing a handheld electronic stylus or pointing device. In this manner, the input data is converted into a digital representation of the physical chart. At a next step 108 the now digitized chart data may be processed and analyzed, whereupon the chart results may be sent to a computational department or third party vendor at a step 110. It may be appreciated that because each step prior to digitalization introduces time delays and human error, the timeliness and accuracy of the data may be compromised and may result in ineffective process control leading to production inefficiencies or failures.

FIG. 2 is an illustrative prior art representation of chart 200 and manually processed chart 210 using conventional methods. In particular, FIG. 2 illustrates prior art chart 200 otherwise known as a circular chart paper. Chart 200 includes gridlines 202 that represent a numerical scale having a known interval. Circular charts manufactured by companies such as Barton, ABB, and Honeywell, etc. are well-known in the art. Chart 200 further includes recorded data 204 and 206. Recorded data represents changes in process variables or parameters over time. Further illustrated in FIG. 2 is a digital representation of a manually traced chart 210, which includes gridlines 212 and data lines 214 and 216 that correspond with recorded data lines 204 and 206 respectively.

As such, methods for automated chart analysis are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for analyzing a chart using an electronic computing device are presented, the methods including: causing the electronic computing device to receive a chart image corresponding with the chart, the chart image having recorded chart data; analyzing the recorded chart data, where the analyzing returns at least measurement values corresponding with the recorded chart data; and returning volumetric results of the processing to a user. In some embodiments, the recorded chart data corresponds with data selected from the group consisting of: temperature data, differential pressure data, and static pressure data. In some embodiments, the chart corresponds with a chart integration device or a chart recorder. In some embodiments, methods further include: capturing the chart image with a mobile image capture device. In some embodiments, the mobile image capture device is selected from the group consisting of: a digital camera, a video camera, a scanner, a smart phone, and a tablet. In some embodiments, the analyzing the recorded chart data includes: aligning the chart image with a known template; converting color space and performing image pixel recognition of the chart image; performing de-noise and curve smoothing operations; and integrating image pixels corresponding with the chart image to numeric values and volumes. In some embodiments, the aligning the chart image further includes: extracting a number of image object features of the chart image and matching the number of image object features with known template object features; matching the chart image with a known template; and applying a transformation matrix to align the chart image with the known template. In some embodiments, the aligning the chart further includes: applying a scale-invariant feature transform (SIFT) to detect and describe the number of image object features. In some embodiments, the known template corresponds with a number of charts having different durations and patterns. In some embodiments, the converting color space and performing image pixel recognition further includes: extracting a number of light invariance features associated with image pixel levels; and identifying image pixels of the chart image by utilizing a number of pre-learned classification and clustering models, where a portion of the image pixels correspond with a number of data markings recorded on the chart, and where a portion of the image pixels correspond with a number of template markings. In some embodiments, the number of data markings recorded on the chart correspond with at least one of: differential pressure readings, static pressure readings, and temperature readings. In some embodiments, the performing the de-noise operation removes misclassified pixels, and the performing the curve smoothing operation utilizes interpolation/extrapolation to connect any discontinuity associated with a number of data markings on the chart image. In some embodiments, the integrating image pixels corresponding with the chart image to numeric values and volumes further includes: integrating measurement values from a pixel domain to a numeric data domain by coordinate system transformation; and calculating volumetric data from the integrated measurement values.

In other embodiments, computing device program products for analyzing a chart using an electronic computing device are presented, the computing device program products including: a non-transitory computer readable medium; first programmatic instructions for causing the electronic computing device to receive a chart image corresponding with the chart, the chart image having recorded chart data;

second programmatic instructions for analyzing the recorded chart data, where the analyzing returns at least measurement values corresponding with the recorded chart data; and third programmatic instructions for returning volumetric results of the processing to a user, where the programmatic instructions are stored on the non-transitory computer readable medium. In some embodiments, the analyzing the recorded chart data includes: fifth programmatic instructions for aligning the chart image with a known template, where the fifth programmatic instructions for aligning the chart image includes: extracting a number of image object features of the chart image and matching the number of image object features with known template object features, matching the chart image with a known template, and applying a transformation matrix to align the chart image with the known template; sixth programmatic instructions for converting color space and performing image pixel recognition of the chart image, where the sixth programmatic instructions for converting color space and performing image pixel recognition includes: extracting a number of light invariance features associated with image pixel levels, and identifying image pixels of the chart image by utilizing a number of pre-learned classification and clustering models, where a portion of the image pixels correspond with a number of data markings recorded on the chart, and where a portion of the image pixels correspond with a number of template markings; seventh programmatic instructions for performing de-noise and curve smoothing operations, where the performing the de-noise operation removes misclassified pixels, and where the performing the curve smoothing operation utilizes interpolation/extrapolation to connect any discontinuity associated with a number of data markings on the chart image; and eighth programmatic instructions for integrating image pixels corresponding with the chart image to numeric values and volumes, where the eighth programmatic instructions for integrating image pixels corresponding with the chart image to numeric values and volumes includes: integrating measurement values from a pixel domain to a numeric data domain by coordinate system transformation, and calculating volumetric data from the integrated measurement values.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
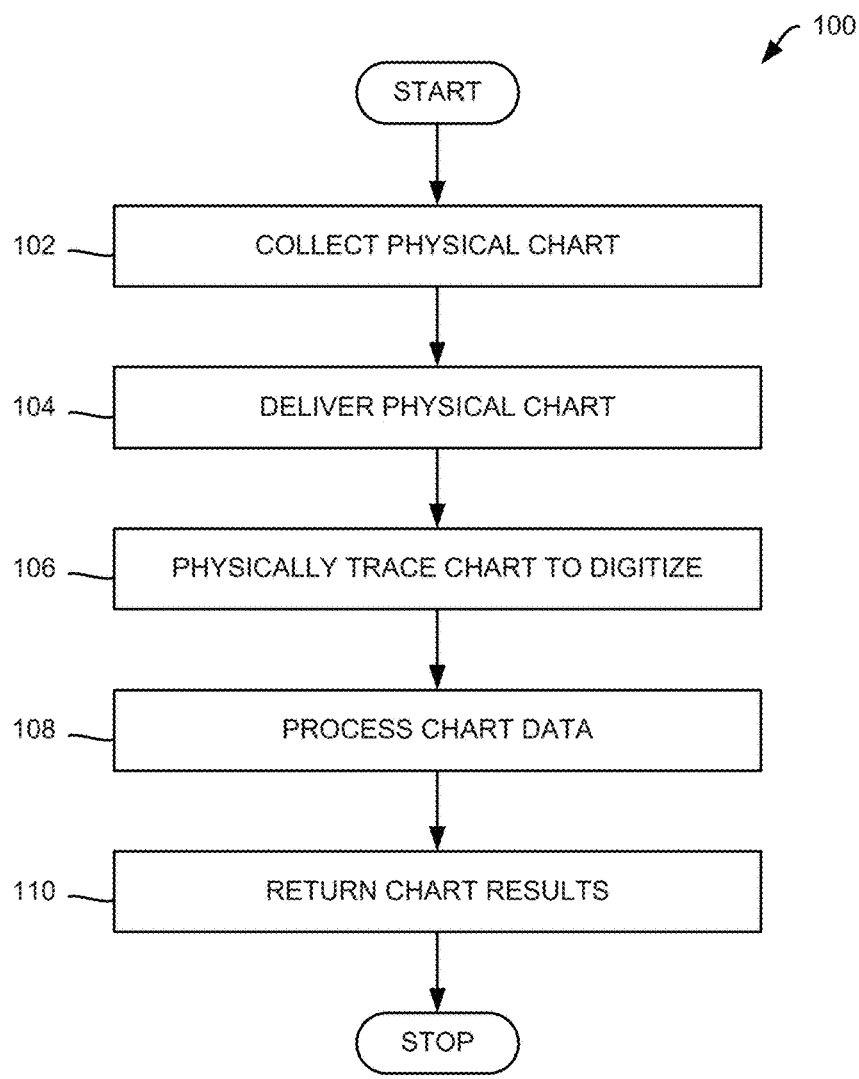
FIG. 1 is an illustrative prior art flowchart of a manual method for analyzing a chart.

As will be appreciated by one skilled in the art, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

A computer readable storage medium, as used herein, is not to be construed as being transitory signals/per se/, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Figure 3:
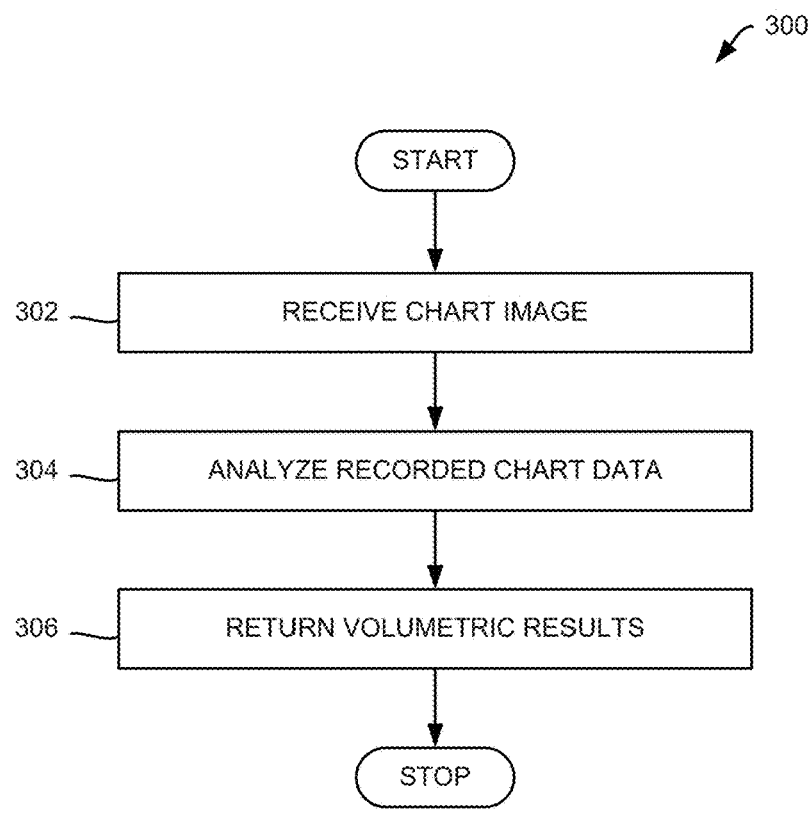
FIG. 3 is an illustrative flowchart of an overview of methods for automatically analyzing a chart in accordance with embodiments of the present invention.

FIG. 3 is an illustrative flowchart 300 of an overview of methods for automatically analyzing a chart in accordance with embodiments of the present invention. At a first step 302, the method receives a chart image having corresponding with a chart having recorded chart data. As noted above, a chart integrator is a device that records mechanical or electrical input data (chart data) by means of moving a chart across one or more moving pens. In embodiments, recorded chart data may correspond with, for example, temperature data, differential pressure data, and static pressure data without limitation. In embodiments, the method captures the chart with, for example, a mobile image capture device such as a digital camera, a video camera, a scanner, a smart phone, and a tablet. Images may be captured automatically by a stationary mobile image capture device or may be captured manually by an operator. Images captured digitally may be readily and easily delivered to an analysis platform as compared with conventional methods that require sending the physical chart via mail or personal delivery. At a next step 304, the method analyzes the recorded chart data on the chart image. Step 304 will be discussed in further detail below for FIG. 4. At a next step 306, the method returns volumetric results corresponding with the recorded chart data to the operator whereupon the method ends. In some embodiments, volumetric results may be returned within moments of submitting a chart image. In this manner, the efficient delivery of results may provide substantially immediate data analysis to an onsite operator. Furthermore, although the examples provided herein illustrate analysis of a circular chart, methods may be equally applied to other charts from other chart recording devices such as a strip chart or a roll chart without limitation.

Figure 4:
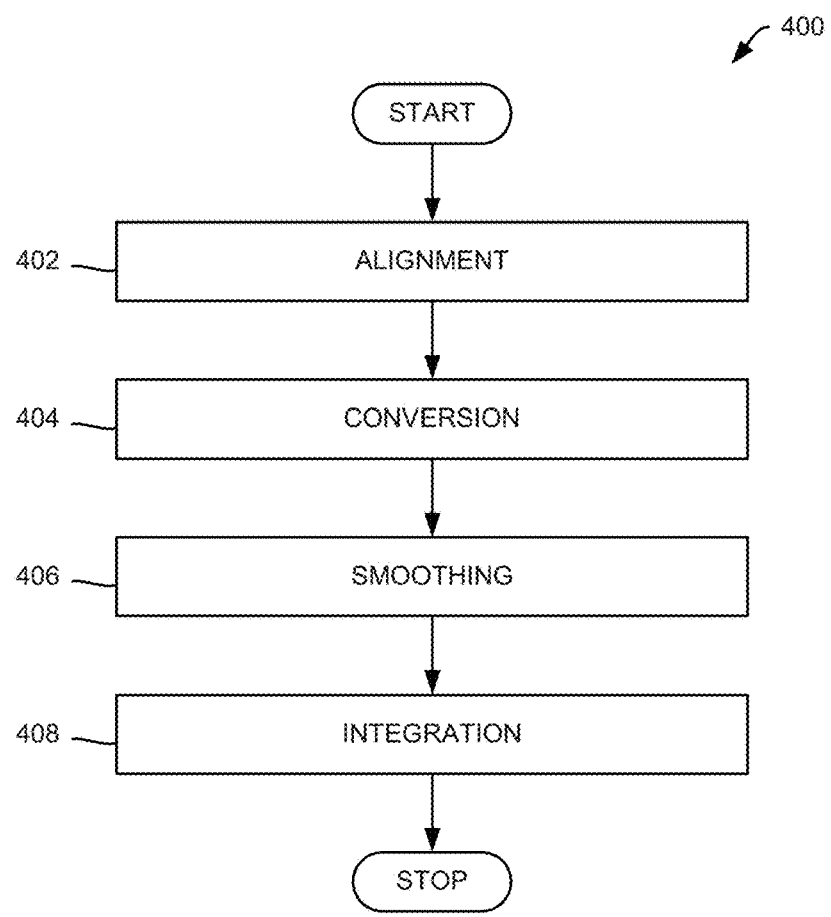
FIG. 4 is an illustrative flowchart of methods for analyzing a chart in accordance with embodiments of the present invention.

FIG. 4 is an illustrative flowchart 400 of methods for analyzing a chart in accordance with embodiments of the present invention. In particular, flowchart 400 further illustrates a step 304 of FIG. 3. At a step 402, the method performs alignment. In embodiments, alignment may be performed in three steps. First, the method extracts image object features of the chart image and matches the image object features with known template object features. As utilized herein, object features are features that provide identifying indicia so that a match may be obtained. In embodiments, object features may be referenced with scale-invariant feature transform (SIFT) image features. SIFT is a widely applied algorithm in computer vision to detect and describe local features in images. For any object in an image, interesting points on the object can be extracted to provide a "feature description" of the object. Second, once object features are extracted, a best match with a known template may be performed. Any number of known templates having different durations or patterns may be utilized in embodiments. Third, once a match is found, the method aligns the chart image with the known template by applying a transformation matrix.

At a next step 404, the method performs conversion. In embodiments, conversion from an RGB color space to an LAB color space may be performed in order to digitally differentiate the recorded data for improved recognition. The method performs conversion by extracting a plurality of light invariance features associated with image pixel levels and by identifying image pixels of the chart image by utilizing a plurality of pre-learned classification and clustering models. Image pixels of the chart image correspond generally with data markings and template markings. In embodiments, the data markings may include without limitation: differential pressure readings, static pressure readings, and temperature readings. At a next step 406, the method performs smoothing. In embodiments, smoothing may proceed by performing a de-noise operation to remove any misclassified pixels and by performing a curve smoothing operation utilizing interpolation/extrapolation to connect any discontinuity associated with the data markings on the chart image. Smoothing may be useful to overcome discrepancies introduced to the chart. For example, where a physical chart is damaged in some way, smoothing may be useful to reconstruct the damaged portion of the chart. In another example, smoothing may be useful to remove data reading anomalies. Thus, where in conventional methods an operator must make an on-the-spot subjective judgment of the damage, methods disclosed herein provide a consistent and reliable method for handling damaged or anomalous charts.

At a next step 408, the method performs integration. In embodiments, integration may proceed by integrating measurement values from the pixel domain to a numeric data domain by coordinate system transformation; and by calculating volumetric data from the integrated measurement values, whereupon the method ends. Integration may proceed using any number of mathematical and statistical analysis known in the art without departing from embodiments provided herein. In embodiments, integration may proceed using numeric variables and equations in accordance with generally accepted petroleum and gas industry standards.

Figure 2:
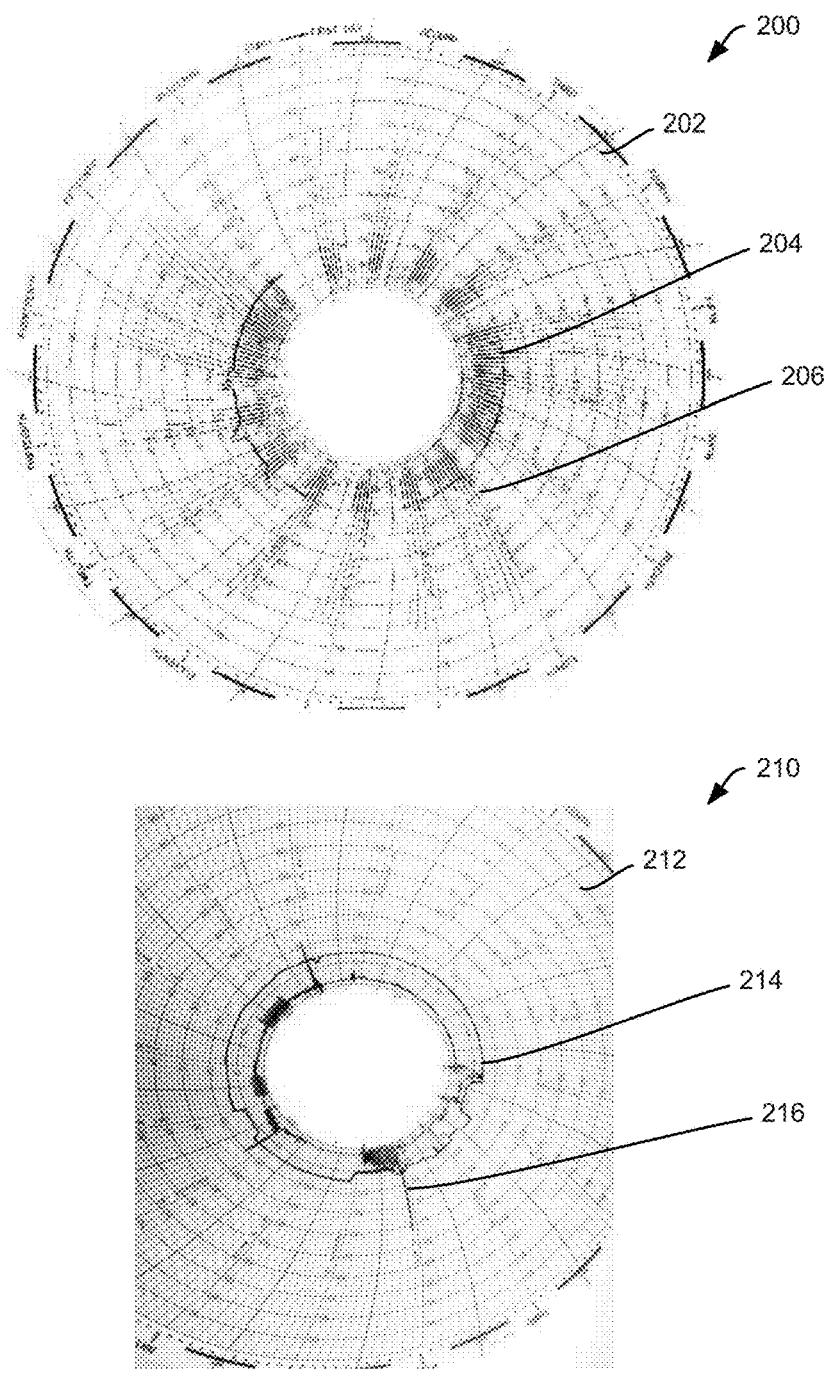
FIG. 2 is an illustrative prior art representation of a chart and a manually processed chart using conventional methods.
Figure 5:
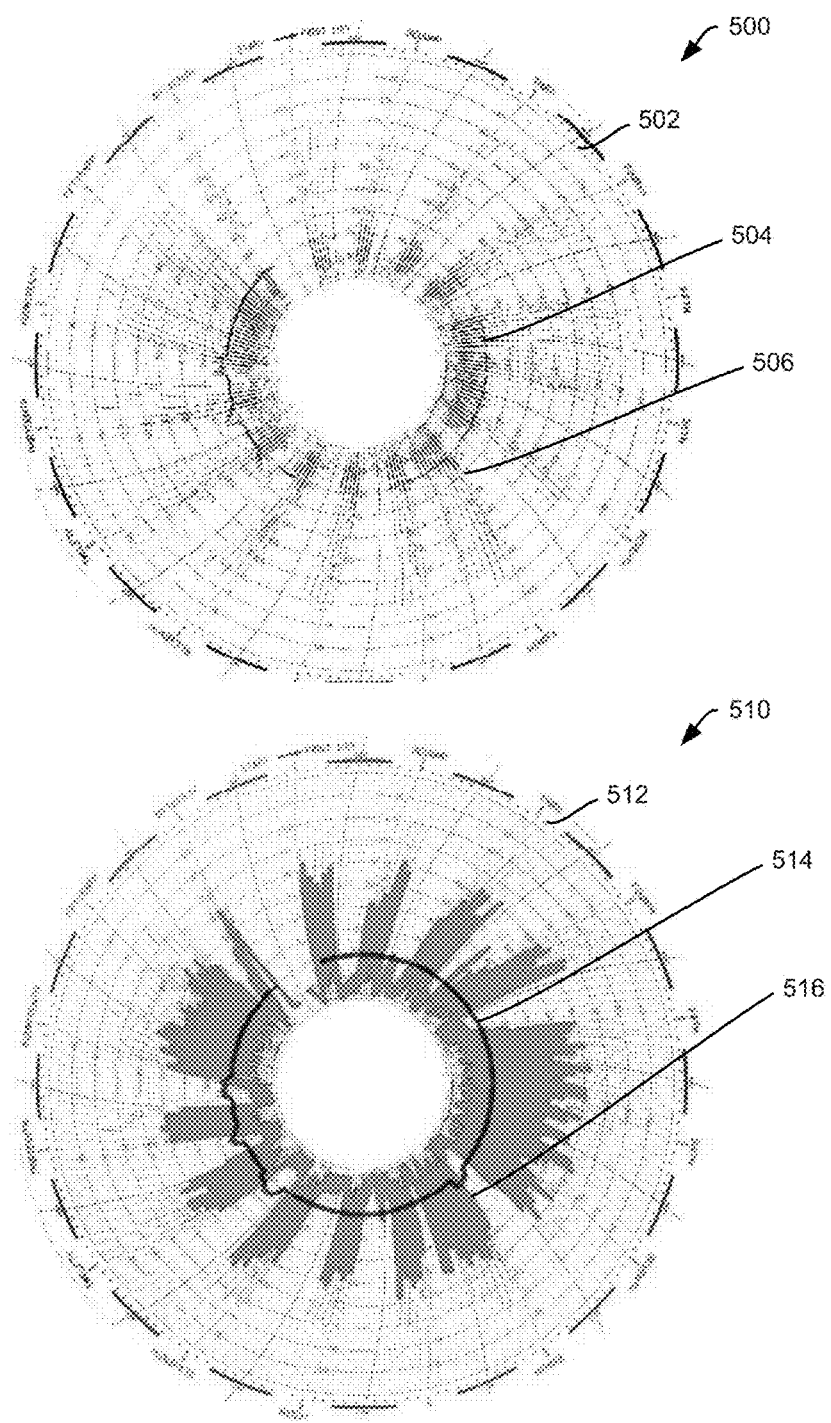
FIG. 5 is an illustrative representation of a chart and an automatically processed chart using methods in accordance with embodiments of the present invention.

FIG. 5 is an illustrative representation of chart 500 and automatically processed chart 510 processed using methods in accordance with embodiments of the present invention. In particular, FIG. 5 illustrates chart 500 that includes gridlines 502 and recorded data 504 and 506. As noted above, recorded data represents changes in process variables or parameters over time. Further illustrated in FIG. 5 is automatically processed chart 510, which includes gridlines 512 and data lines 514 and 516 that correspond with recorded data lines 504 and 506 respectively. In comparing manually processed chart 210 (FIG. 2) with automatically processed chart 510 (FIG. 5), it may be appreciated that the detail and accuracy of the automatically processed chart is greater than the manually processed chart. In addition, automated methods result in lower processing times. Thus, a more refined analysis of charts may be achieved utilizing methods disclosed herein.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for analyzing a chart using an electronic computing device, the method comprising:
   causing the electronic computing device to receive a chart image corresponding with the chart, the chart image having recorded chart data; aligning the chart image with a known template by extracting an image object feature, matching the extracted image object feature with a template object feature, and applying a transformation based on the matching to the chart image;
   converting the chart image by converting a color space of the chart image and performing image pixel recognition of data marking and template markings on the chart image;
   performing a de-noise operation to remove misclassified pixels from the chart image and curve smoothing operations on the chart image;
   integrating image pixels corresponding with the chart image to numeric values and volumes by integrating measurement values from the pixel domain to a numeric data domain by coordinate system transformation;
   returning at least the integrated measurement values corresponding with the recorded chart data; and
   returning volumetric results calculated based on the integrated measurement values to a user.

2. The method of claim 1, wherein the recorded chart data corresponds with data selected from the group consisting of: temperature data, differential pressure data, and static pressure data.

3. The method of claim 1, wherein the chart corresponds with a chart integration device or a chart recorder.

4. The method of claim 1, further comprising:
   capturing the chart image with a mobile image capture device.

5. The method of claim 4, wherein the mobile image capture device is selected from the group consisting of: a digital camera, a video camera, a scanner, a smart phone, and a tablet.

6. The method of claim 1, wherein the aligning the chart image further comprises:
   extracting a plurality of image object features of the chart image and matching the plurality of image object features with a plurality of known template object features;
   matching the chart image with the known template; and
   applying a transformation matrix of the transformation that is associated with the known template to align the chart image with the known template.

7. The method of claim 6, wherein the aligning the chart further comprises:
   applying a scale-invariant feature transform (SIFT) to detect and describe the plurality of image object features.

8. The method of claim 6, wherein the known template corresponds with a plurality of charts having different durations and patterns.

9. The method of claim 1, wherein the converting color space and performing image pixel recognition further comprises:
extracting a plurality of light invariance features associated with image pixel levels; and identifying image pixels of the chart image by utilizing a plurality of pre-learned classification and clustering models, wherein a portion of the image pixels correspond with a plurality of data markings recorded on the chart, and wherein a portion of the image pixels correspond with a plurality of template markings.

10. The method of claim 9, wherein the plurality of data markings recorded on the chart correspond with at least one of the group consisting of: differential pressure readings, static pressure readings, and temperature readings.

11. The method of claim 1, wherein the performing the de-noise operation removes misclassified pixels, and wherein the performing the curve smoothing operation utilizes interpolation/extrapolation to connect any discontinuity associated with a plurality of data markings on the chart image.

12. The method of claim 1, wherein the integrating image pixels corresponding with the chart image to numeric values and volumes further comprises:
integrating measurement values from a pixel domain to a numeric data domain by coordinate system transformation; and
calculating volumetric data from the integrated measurement values.

13. A computing device program product for analyzing a chart using an electronic computing device, the computing device program product comprising:
a non-transitory computer readable medium;
first programmatic instructions for causing the electronic computing device to receive a chart image corresponding with the chart, the chart image having recorded chart data;
second programmatic instructions for
third programmatic instructions for aligning the chart image with a known template, wherein the third programmatic instructions for aligning the chart image comprises:
extracting a plurality of image object features of the chart image and matching the plurality of image object features with known template object features, matching the chart image with a known template, and
applying a transformation matrix to align the chart image with the known template;
fourth programmatic instructions for converting color space and performing image pixel recognition of the chart image, wherein the fourth programmatic instructions for converting color space and performing image pixel recognition comprises:
extracting a plurality of light invariance features associated with image pixel levels, and
identifying image pixels of the chart image by utilizing a plurality of pre-learned classification and clustering models, wherein a portion of the image pixels correspond with a plurality of data markings recorded on the chart, and wherein a portion of the image pixels correspond with a plurality of template markings;
fifth programmatic instructions for performing de-noise and curve smoothing operations, wherein
the performing the de-noise operation removes misclassified pixels, and wherein the performing the curve smoothing operation utilizes interpolation/extrapolation to connect any discontinuity associated with a plurality of data markings on the chart image; and
sixth programmatic instructions for integrating image pixels corresponding with the chart image to numeric values and volumes, wherein the sixth programmatic instructions for integrating image pixels corresponding with the chart image to numeric values and volumes comprises:
integrating measurement values from a pixel domain to a numeric data domain by coordinate system transformation, and
calculating volumetric data from the integrated measurement values; and
seventh programmatic instructions for returning volumetric results of the processing to a user, wherein the programmatic instructions are stored on the non-transitory computer readable medium.

14. The computing device program product of claim 13, wherein
the recorded chart data corresponds with data selected from the group consisting of: temperature data, differential pressure data, and static pressure data, wherein the chart corresponds with a chart integration device or a chart recorder.

15. The computing device program product of claim 13, further comprising:
fourth programmatic instructions for capturing the chart image with a mobile image capture device, wherein the mobile image capture device is selected from the group consisting of: a digital camera, a video camera, a scanner, a smart phone, and a tablet.

16. The computing device program of claim 13, wherein the plurality of data markings recorded on the chart correspond with at least one of the group consisting of: differential pressure readings, static pressure readings, and temperature readings.

* * * * *